United States Patent
Tomar et al.

(10) Patent No.: US 9,285,967 B2
(45) Date of Patent: Mar. 15, 2016

(54) COMPUTING DEVICE WITH IMPROVED FUNCTION SELECTION AND METHOD

(75) Inventors: Ashutosh Tomar, Coventry (GB); Simon Thompson, Coventry (GB); Paul Youdan, Birmingham (GB); Duncan Robertson, Coventry (GB); Sebastian Paszkowicz, Coventry (GB); Francis McCullough, Bloxham (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 332 days.

(21) Appl. No.: 13/813,425

(22) PCT Filed: Aug. 1, 2011

(86) PCT No.: PCT/GB2011/051448
§ 371 (c)(1),
(2), (4) Date: May 14, 2013

(87) PCT Pub. No.: WO2012/013987
PCT Pub. Date: Feb. 2, 2012

(65) Prior Publication Data
US 2013/0227488 A1     Aug. 29, 2013

(30) Foreign Application Priority Data

Jul. 30, 2010   (GB) .................................. 1012859.3

(51) Int. Cl.
| | | |
|---|---|---|
| *G06F 3/0484* | (2013.01) | |
| *G06F 3/0482* | (2013.01) | |
| *G06F 3/0488* | (2013.01) | |

(52) U.S. Cl.
CPC .......... *G06F 3/04842* (2013.01); *G06F 3/0482* (2013.01); *G06F 3/04886* (2013.01)

(58) Field of Classification Search
CPC ........................... G06F 3/0482; G06F 3/04842
USPC .......................................................... 715/835
See application file for complete search history.

(56) References Cited

U.S. PATENT DOCUMENTS 7,370,288 B1 *   5/2008  Simmons et al. ............. 715/854
7,487,447 B1 *   2/2009  Jerger .......................... 715/252
(Continued)

FOREIGN PATENT DOCUMENTS

| CN | 103098004 A | 5/2013 |
|---|---|---|
| EP | 2598979 A1 | 6/2013 |

(Continued)

OTHER PUBLICATIONS

Great Britain Search Report for application No. GB1012859.3, Sep. 13, 2011, 1 page.
(Continued)

*Primary Examiner* — Matt Kim
*Assistant Examiner* — David Luu
(74) *Attorney, Agent, or Firm* — Reising Ethington P.C.

(57) ABSTRACT

A computing device having a display portion for displaying information and a user input portion for receiving an input from a user. The device is operable to display a first set of user-selectable function elements in a first format and is responsive to an input from a user corresponding to a user-selected portion of the display portion to display a second set of function elements that include one or more function elements of the first set of user-selectable function elements that are associated with the selected portion of the display portion in a second format different from the first format. The device is operable to allow a function element displayed in the second format to be selected by the user thereby to execute a function associated with the element.

22 Claims, 5 Drawing Sheets

(56) References Cited

U.S. PATENT DOCUMENTS

| | | | |
|---|---|---|---|
| 2008/0066007 A1* | 3/2008 | Lau et al. ................. 715/783 |
| 2008/0259041 A1* | 10/2008 | Blumenberg ....... G06F 3/04842 345/173 |
| 2008/0295021 A1 | 11/2008 | Nguyen et al. |
| 2010/0090964 A1 | 4/2010 | Soo et al. |
| 2010/0909640 | 4/2010 | Armstrong et al. |
| 2010/0134432 A1 | 6/2010 | Seo |
| 2011/0181522 A1 | 7/2011 | Rendahl |
| 2011/0205248 A1* | 8/2011 | Honda ................. G06F 3/0482 345/661 |

FOREIGN PATENT DOCUMENTS

| GB | 2351639 A | 1/2001 |
|---|---|---|
| GB | 2482339 A | 2/2012 |
| KR | 20080000892 A | 1/2008 |
| WO | WO0075766 | 12/2000 |
| WO | WO2009022243 | 2/2009 |
| WO | WO2011005543 A2 | 1/2011 |

OTHER PUBLICATIONS

International Search Report for PCT/GB2011/051448 dated Oct. 17, 2011, 4 pages.

Written Opinion for PCT/GB2011/051448 dated Oct. 17, 2011, 5 pages.

* cited by examiner

COMPUTING DEVICE WITH IMPROVED FUNCTION SELECTION AND METHOD

FIELD OF THE INVENTION

The present invention relates to computing devices allowing a user to navigate within or between software applications or internet sites and to a method of operating a computing device. In particular but not exclusively the invention relates to a computing device having improved operability when a user has difficulty selecting accurately a function displayed on a display screen using a user input device.

BACKGROUND

It is known to provide a computing device having a graphical user interface (GUI) arranged to display user-selectable function elements such as menus and hyperlinks. A user may select a function element by means of a user interface device such as a mouse, a touch screen, a touch pen or any other suitable device.

The computing device is typically arranged such that selection of a function element results in the computing device executing a particular function. For example selection of a function element may result in the closure of a window of the GUI, the running of a software application, the saving of a file, or navigation between pages of a website. Function elements arranged to allow navigation between pages of a website or between pages of different websites may be referred to as hyperlinks.

In certain situations a user may experience difficulty selecting accurately a particular menu function or hyperlink. For example, if the screen being viewed by the user is relatively small, for example the screen of a smartphone.

Some known smartphones allow a user to enlarge a given area of the screen by placing a pair of fingers over the area to be enlarged and moving or 'wiping' the fingers apart in contact with the screen to 'expand' the area of interest on the screen. Thus, hyperlinks, function buttons or any other user-selectable function elements displayed on the screen can be enlarged to facilitate accurate selection of the required function element.

A disadvantage of such devices is that a user must concentrate on the screen for an extended period and exhibit a substantial degree of manual dexterity in order correctly to enlarge a required area of the screen. A user must then shrink the screen back to its former size (typically by a reverse wiping action) in order to continue viewing the screen as before.

A user may also experience difficulty selecting a particular function element if the user is in an unstable environment. For example, when travelling in a vehicle, an aircraft or marine vessel the user may be subject to movement or vibrations that reduce his or her ability to select accurately a function element displayed.

In the case of smartphones allowing enlargement of a given area of the screen by wiping a pair of fingers over the screen, a user may experience particular difficulty selecting accurately the area of interest in an unstable environment.

A user may also be compromised in their ability to make an accurate selection due to the performance of other tasks such as when performing navigational operations on land, in the air or at sea. Similarly, a pilot of an aircraft may have difficulty selecting a function element of a screen due to multi-tasking operations which may include the simultaneous performance of a flight maneuver, navigational tasks and communications with air traffic control.

In other situations users may suffer from one or more medical conditions that affect their ability to make an accurate selection of a function element, or wipe their fingers in a coordinated manner over the screen in order to enlarge a given area as described above.

It is an aim of embodiments of the present invention to at least partially mitigate the disadvantages of known computing devices with GUI's having user-selectable function elements.

STATEMENT OF THE INVENTION

Aspects of the invention may be understood by reference to the appended claims.

In one aspect of the invention there is provided computing apparatus comprising a computing device, the device comprising: a display portion for displaying data; and a user input portion for receiving an input from a user, the device being operable to display a first set of user-selectable function elements in a first format, the device being arranged to receive an input from a user corresponding to a user-selected portion of the display portion and to display a second set of function elements comprising one or more function elements of the first set of user-selectable function elements that are associated with the selected portion of the display portion in a second format different from the first format, the device being operable to allow a function element displayed in the second format to be selected by the user thereby to execute a function associated with the element.

The data displayed by the display portion may be data input to the device by means of a connection such as a disk, a memory card of any other suitable means.

Optionally the second format is a format prescribed by the apparatus.

Alternatively the first format is a format prescribed by the apparatus.

The first and/or second format may be prescribed by the computing device.

Further optionally the first format is a format prescribed by an external content provider.

Advantageously the apparatus is arranged to identify a function element associated with the user-selected portion of the display as a function element having a portion thereof falling within a prescribed area of the display associated with the user-selected portion of the display.

Thus if a function element has a portion thereof falling within a prescribed area of the display associated with the user-selected portion of the display, the apparatus identifies the function element as a function element associated with the user-selected portion of the display.

Advantageously the prescribed area of the screen is an area containing the user-selected portion.

Optionally the prescribed area is a portion of the display of prescribed dimensions.

The prescribed dimensions may be substantially fixed dimensions independent of the number of function elements displayed on the display.

Alternatively the prescribed dimensions may depend on at least one selected from amongst the number of function elements displayed on the display, the distance between two or more of the function elements on the display and a size of the function elements as displayed on the display.

Advantageously the prescribed area is an area centered on the user-selected portion of the display.

The apparatus may be arranged to determine that a function element is a function element associated with the user-selected portion of the display if the function element is one of the N closest function elements to the user-selected portion of the display.

N may be a prescribed integer.

N may be one selected amongst the integers 1, 2, 3, 4, 5, 6, 7, 8, 9 and 10.

Advantageously the user-selected portion comprises one of more of a plurality of index areas of the display portion containing the user-selected portion, the index areas being areas of substantially fixed size and location with respect to a boundary of the display portion.

The apparatus may be arranged to provide an indication to a user as to the correspondence between function elements displayed in the first and second formats thereby to assist a user in selecting a function element in the second format based on recognition by the user of the correspondence between elements displayed in the first and second formats.

The apparatus may be arranged to indicate the correspondence between function elements displayed in the first and second formats by means of one selected from amongst highlighting function elements displayed in the first format that are members of the second set, associating a color with function elements in the first format that are members of the second set, and associating an icon with function elements in the first format that are members of the second set.

Advantageously the apparatus is arranged to indicate the correspondence between function elements displayed in the first and second formats by highlighting the function elements displayed in the first format that are members of the second set with different respective colors and displaying an icon by each function element displayed in the second format, the icon having a color corresponding to the color with which the corresponding function element displayed in the first format is highlighted.

The apparatus may be arranged to identify user-selectable function elements by reference to one or more identifiers contained in data processed by the apparatus, the apparatus being arranged to detect the one or more identifiers.

The apparatus may identify the one or more identifiers in an operation such as a parsing operation, by means of a string search algorithm or by any other suitable operation.

The identifiers may be identifiers that are understood to indicate that a user-selectable function element is associated with the identifier. For example, a hyperlink identifier contained in hypertext markup language (HTML) provided by a content provider. Data following an identifier of a user-selectable function element or provided between respective identifiers may therefore be displayed in a format indicating that it corresponds to a user-selectable function element. For example text associated with the data may be underlined, emboldened or otherwise displayed in a manner indicating that it corresponds to a user-selectable function element. Thus software code in which the data actually displayed on the screen is contained may contain a command or identifier identifying a portion of data as corresponding to a URL (uniform resource locator) and that the URL is to be displayed as a hyperlink.

The apparatus may be arranged to identify user-selectable function elements by detection of one or more structures in data displayed by the device other than hyperlink identifiers.

Thus it is to be understood that a sub-set of user-selectable function elements may exist that are function elements detected by the apparatus in the absence of identifiers in the data itself identifying a particular portion of data as a user-selectable function element. Members of this sub-set may be referred to herein as apparatus-associated user-selectable function elements.

For example the apparatus may be configured to detect that a particular portion of data corresponds to an address by detecting a postcode, a zip code or the like. The device may be configured to detect an email address, a telephone number, a name, a URL or any other suitable data with which the device may associate a user-selectable function element. In some embodiments the apparatus may detect an email address by detecting a structure having an '@' symbol and optionally one or more '.' symbols in an expected structural format associated with the @ symbol. A URL may be detected by means of a prefix "http" or "www" or a portion ".com" or the like.

In other words, if a given portion of data processed by the apparatus does not have an identifier identifying that portion as having a user-selectable function associated therewith, the apparatus itself may be able to associate a user-selectable function with that data portion by detecting or otherwise recognizing a structure of the data. The portion of data may therefore be determined by the apparatus to be a user-selectable function element.

It is to be understood that the user-selectable function associated with a hyperlink encoded in the data may be to navigate to content encoded in the hyperlink (which may be a website URL).

Thus the apparatus may be operable dynamically to recognize non-URL data elements within data content such as a data file or a data stream. The apparatus may be arranged to recognize non-URL data elements in a data file corresponding to a web page, a document or any other suitable data form. The apparatus may be operable to create a hyperlink (i.e. a user-selectable function element) in respect of detected non-URL data elements. The apparatus may be operable upon selection by a user of such a hyperlink to display the hyperlink in the second format as described above.

The apparatus may be operable to identify one or more structures in video data. Alternatively or in addition the apparatus may be operable to identify one or more structures in audio data. For example, in the case of audio data a voice recognition algorithm or other audio processing algorithm may be employed such as an algorithm adapted to recognize a prescribed one or more patterns in music data. In the case of video data the apparatus may be arranged to apply image recognition processes to image data such as face recognition, object recognition and the like.

The apparatus may be operable to generate one or more function elements for display on the display portion responsive to which the apparatus may be arranged to capture a frame of a video stream, an image displayed on the display, a portion or the whole of an audio or audio/video file or datastream or the like. The apparatus may be operable to allow a user to make a selection of a data portion from an audio or video file at a given moment in time during playback of the file, i.e. the apparatus may be operable to allow temporal selection of content.

The apparatus may be operable to identify user-selectable function elements by detection of one or more structures in data displayed by the device responsive to an input from a user.

For example, the apparatus may be arranged to detect one or more structures in data displayed in the user-selected portion of the display responsive to a prescribed input from a user, such as a double tap of a touchscreen or double click of a mouse.

Advantageously the input from the user is provided by means of at least one selected from amongst a mouse, one or more keys, a touchscreen and a mind control apparatus.

By mind control apparatus is meant apparatus arranged to allow a user to provide an input by means of mental thoughts rather than actuation of a physical control such as a mouse or touchscreen. Thus the mind control apparatus may be arranged to monitor neurological electrical signals of a user in order to obtain the user's input.

Other input means are also useful.

Input may be provided by means of a keypad or an arrangement of keys at spaced apart locations. The keys may be provided at locations corresponding to those of the function elements when displayed in the second format. For example the keys may be arranged in an array such as a 2×2 array, a 3×2 array or any other suitable c×r array where c, r are integers corresponding to the number of columns and rows of function elements displayed in the second format.

The keys may be mounted to a dashboard of a motor vehicle in which the apparatus is provided. Alternatively or in addition they may be mounted to a steering wheel, a door panel or at any other suitable location. In some arrangements one or more keys may be soft keys. In some arrangements one or more keys may be hard keys.

The apparatus may be operable to allow the user to define the user-selected portion of the display portion by selection of a plurality of positions of the display portion.

Advantageously the apparatus is operable to allow the user to define the user-selected portion of the screen by one selected from amongst a swipe action and a drag action. It is to be understood that a single swipe or single drag action is capable of allowing a user to define a plurality of positions of the display portion.

A swipe action may for example be performed by a user's finger across a touchscreen whilst a swipe or drag action may be performed by a user operating a mouse, where a pointer is dragged whilst a mouse button is pressed. It is to be understood that in some embodiments only one of these actions may be performed. For example in some embodiments having a touchscreen but no mouse functionality only a swipe action may be allowable to define a user-selected portion of the display portion.

Advantageously, in the event a user-selectable function element has a plurality of functions associated therewith the apparatus is operable upon selection of the function element to request a user to identify which of the plurality of functions is to be executed.

Thus for example if the apparatus detects an email address contained in data for display the apparatus may provide the user with an opportunity to select the email address on the display when the second set of function elements are displayed in the second format. Upon selection of the email address from the display of function elements of the second set in the second format the apparatus may then invite the user to select which of the plurality of executable functions associated with the selected function element (in this example an email address) is to be performed. The functions may include the function of storing the email address in an address book and the function of generating an email for sending to that email address.

Advantageously the apparatus is arranged to identify user-selectable function elements in data by reference to Hyper-Text Markup Language (HTML) defining content to be displayed.

Optionally the apparatus is arranged to determine whether a hypertext link (or hyperlink) displayed on the display portion is associated with a user-selected portion of the display by reference to a position on the display portion of text, an image or an icon associated with the hyperlink.

Alternatively or in addition the apparatus may be arranged to identify user-selectable function elements by reference to video memory defining a state of pixels of the display portion.

By state of pixels is meant a state of the pixel whereby the pixel conveys information to a user. For example, a relative contrast, a color, a grayscale or any other means by which a pixel conveys information to a user.

The apparatus may be arranged to identify user-selectable function elements by reference to a stream of data defining a state of pixels of the display portion.

Thus, instead of reading video memory the device may read a stream of data by which the state of pixels of the display portion are provided to the display portion to set the state of pixels. Other arrangements are also useful.

The apparatus may be arranged to identify user-selectable function elements by optical character recognition in respect of information displayed on the display portion.

Thus, in contrast to analyzing instructions in data for display such as HTML commands by which the device determines how and where to display function elements, the device may be arranged to process data substantially as displayed on the display, i.e. substantially in the form in which it is displayed.

The apparatus may be arranged to identify user-selectable function elements by optical character recognition by reference to a state of pixels of the display portion.

Optionally the first set of user-selectable function elements as displayed in the first format each have respective text, an image or an icon associated therewith, the device being arranged to display at least a portion of the text, image or icon associated with each function element of the second set in the second format.

The apparatus may be arranged to identify user-selectable function elements in the form of buttons of software applications.

The device of the apparatus may be an automotive data reception device.

The apparatus (optionally the device, where the apparatus comprises more components that the device) may be arranged to be mounted to one selected from amongst a dashboard of a vehicle and a seat-back of a vehicle.

The apparatus (optionally the device, where the apparatus comprises more components that the device) may be provided in a vehicle.

The device may be at least one selected from amongst a mobile device, a mobile communications device and a two-way mobile telecommunications device.

The device may comprise a desktop computing device.

The device may be operable to communicate with a remote server thereby to receive data for display.

The apparatus may consist of the computing device only.

Thus the device may be operable independently of any other computing device or apparatus to perform the operations described in respect of data input to the device.

Alternatively the apparatus may further comprise at least one computing device remote from the display portion, the at least one remote computing device being operable to process data to be displayed on the display portion thereby to reduce an amount of processing required to be performed by the device in respect of a given set of data to be displayed.

Thus the apparatus may be arranged to operate by means of a communications link such as a network connection, a world wide web connection of any other suitable link. The link may comprise a wireless connection, a wired connection or any other suitable connection.

In a further aspect of the invention there is provided a method of executing a function associated with a computing apparatus comprising the steps of: displaying by means of a display portion a first set of user-selectable function elements in a first format; receiving by means of a user input portion an input from a user corresponding to a user-selected portion of the display portion; displaying by means of the display portion one or more of the first set of user-selectable function elements associated with the selected portion of the display portion in a second format different from the first format; and receiving by means of the user input portion an input from the user corresponding to a function element displayed in the second format and executing a function associated with the element.

In one aspect of the invention there is provided a computing device comprising: a display portion for displaying information; and a user input portion for receiving an input from a user, the device being operable to display a first set of user-selectable function elements in a first format, the device being arranged to receive an input from a user corresponding to a user-selected portion of the display portion and to display a second set of function elements comprising one or more function elements of the first set of user-selectable function elements that are associated with the selected portion of the display portion in a second format different from the first format, the device being operable to allow a function element displayed in the second format to be selected by the user thereby to execute a function associated with the element.

In a further aspect of the invention there is provided a method of executing a function associated with a computing device comprising the steps of: displaying by means of a display portion a first set of user-selectable function elements in a first format; receiving by means of a user input portion an input from a user corresponding to a user-selected portion of the display portion; displaying by means of the display portion one or more of the first set of user-selectable function elements associated with the selected portion of the display portion in a second format different from the first format; and receiving by means of the user input portion an input from the user corresponding to a function element displayed in the second format and executing a function associated with the element.

In a still further aspect of the invention there is provided a motor vehicle comprising a device according to a preceding aspect.

The device may be mounted to one selected from amongst a dashboard of the vehicle and a seat of the vehicle.

In one aspect of the invention there is provided a vessel comprising a device according to a preceding aspect.

In a further aspect of the invention there is provided an aircraft comprising a device according to a preceding aspect.

In a still further aspect of the invention there is provided mobile telecommunications apparatus comprising a device according to a preceding aspect.

In one aspect of the invention there is provided computer program code arranged to be executed on a device thereby to implement the method of a preceding aspect.

In a further aspect of the invention there is provided a computer readable medium containing computer program code arranged to be executed on a device thereby to implement the method of a preceding aspect.

BRIEF DESCRIPTION OF THE DRAWINGS

Embodiments of the invention will now be described with reference to the accompanying figures in which.

DETAILED DESCRIPTION

Figure 1:
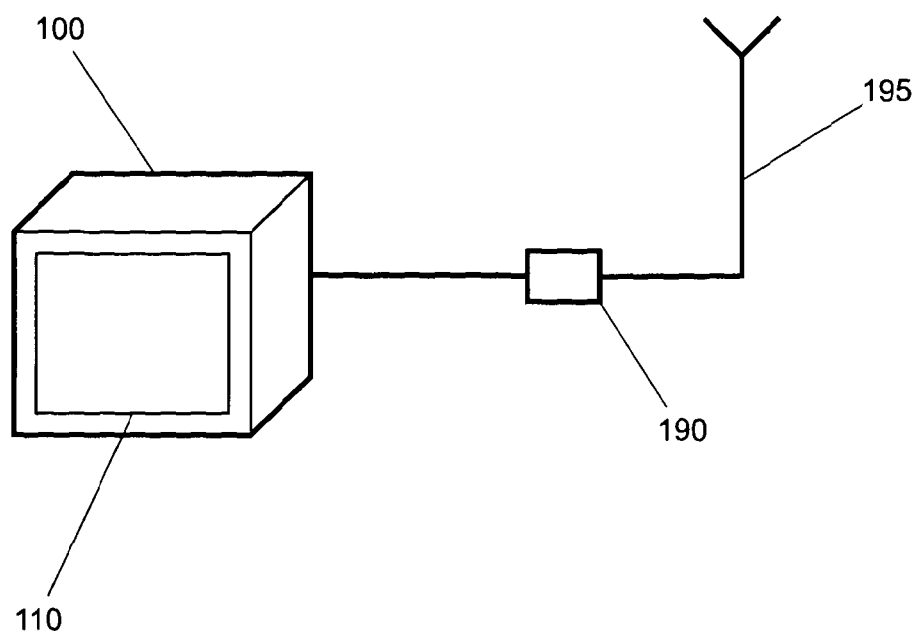
FIG. 1 is a schematic illustration of apparatus according to an embodiment of the present invention.

In one embodiment of the present invention a computing device 100 is provided having a display portion 110 in the form of a touch-screen (FIG. 1). The device 100 is connected to a data receiver 190 arranged to receive by means of an antenna 195 data transmitted by a radio transmitter. The radio transmitter may be part of a network such as a cellular network in a mobile telecommunications system.

The device 100 is arranged to receive data from the data receiver 190 and to display received data on the display portion 110.

In one embodiment the device 100 is arranged to receive data corresponding to the content of a website in HyperText Markup Language (HTML) and to display the content on the display portion. The content may include user-selectable function elements in the form of hyperlinks.

It is to be understood that the device 100 is arranged to display hyperlinks 120 and other content of the received data substantially in the form as communicated to and received by the device 100 for display. That is, with any text or icons associated with the content displayed in the relative positions and of a relative size substantially as intended by the content provider.

It is to be understood that any such display of content is made within the constraints of the capability of the device 100 such as a resolution of the display portion. This format by which the device 100 displays content will be referred to as a 'received format' of the content.

Figure 2:
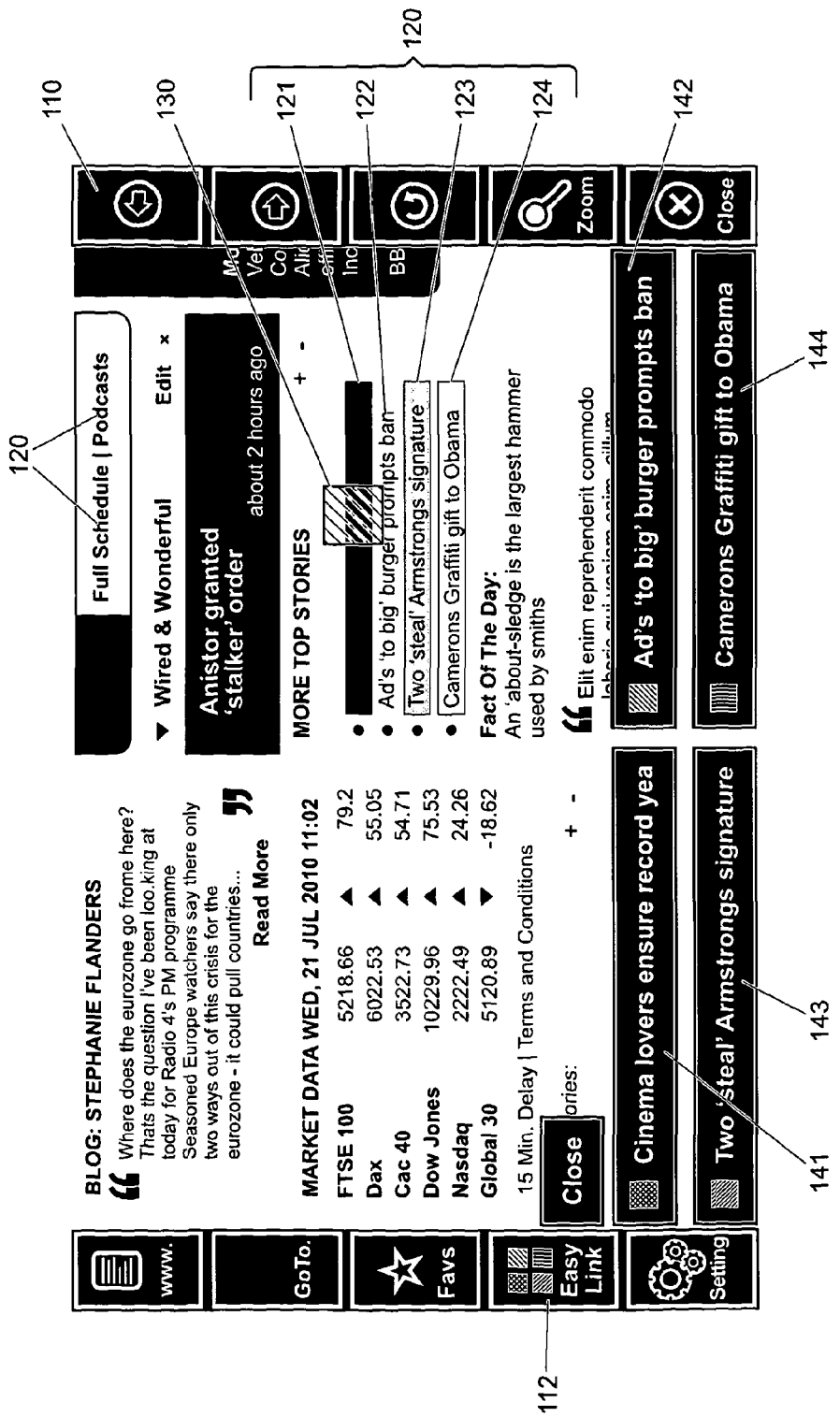
FIG. 2 shows a screenshot taken from the display portion of apparatus according to an embodiment of the invention showing hyperlinks displayed in a received format and four of the hyperlinks displayed in a user-assist format.

The device 100 is operable to allow a user to select a hyperlink 120 displayed in the received format by touching the touchscreen 110 at the location of the hyperlink. The device 100 determines which hyperlink has been selected by detecting the location of the screen at which the user touched the screen. This location will be referred to as a 'user-selected location' 130. An example of a user selected location 130 is shown shaded in FIG. 2. The user-selected location 130 may be a single point on the touchscreen 110 or a finite area, e.g. an area corresponding to that of the area of a user's finger in contact with the touchscreen 110.

The device 100 then performs the function associated with the selected hyperlink, such as displaying the content of a web-page the address of which is provided by the hyperlink.

In addition to this conventional functionality of a display device, the device 100 is also provided with a 'user-assist' button 112 the selection of which places the device in a user-assist mode. The user-assist mode may also be referred to herein as an EasyLink mode.

With the device 100 in the user-assist mode, upon detecting that a user has touched the touchscreen 110 at a user-selected location 130 the device 100 is arranged to determine the four nearest hyperlinks 121, 122, 123, 124 to the user-selected location 130.

These hyperlinks 121, 122, 123, 124 will be referred to as a 'suggested group' of hyperlinks since they are hyperlinks one of which the device 100 suggests the user may wish to select based on the position of the user-selected location 130.

Text associated with the suggested group of hyperlinks 121, 122, 123, 124 is then displayed on the display portion 110 in a prescribed user-assist format 141, 142, 143, 144 in addition to the received format 121, 122, 123, 124.

The text displayed in user-assist format 141, 142, 143, 144 is arranged such that the text is of a prescribed size and the hyperlinks displayed with a prescribed spacing that will be readily visible to a user to assist the user in correctly selecting the hyperlink that they wish to follow. Other arrangements of text, icons or images associated with a suggested hyperlink 121, 122, 123, 124 are also useful.

The device 100 is arranged such that a user may subsequently select the hyperlink of their choice as displayed in the user-assist format 141, 142, 143, 144 and thereby cause the device 100 to perform the function associated with the selected hyperlink 141, 142, 143, 144.

It is to be understood that a user can determine which of the hyperlinks 141, 142, 143, 144 of the user-assist format to select by reading text displayed in the user-assist format 141, 142, 143, 144.

The device is also arranged to highlight text associated with each of the suggested hyperlinks 141, 142, 143, 144 as displayed in the received format 121, 122, 123, 124 in a different respective prescribed color (in one embodiment the colors are red, green, blue and yellow in the case that four hyperlinks are suggested).

The corresponding display of each of the hyperlinks in the user-assist format 141, 142, 143, 144 is arranged such that an icon is displayed next to each hyperlink 141, 142, 143, 144, the icon having the same color as the highlighted hyperlink displayed in the received format 121, 122, 123, 124. In the embodiments shown the icon is a square of a corresponding fill color.

Thus, in addition to or instead of reading text presented in the user-assist format 141, 142, 143, 144, the user may determine which hyperlink to select based on the color of the highlight of the desired hyperlink as displayed in the received format 121, 122, 123, 124 and the corresponding color of the icon displayed in the user-assist format 141, 142, 143, 144.

It is to be understood that other arrangements are also useful. For example instead of highlighting hyperlinks displayed in the received format 121, 122, 123, 124 the device 100 may display an icon next to those hyperlinks 121, 122, 123, 124 and a corresponding icon next to the hyperlink text displayed in the user-assist format 141, 142, 143, 144. Corresponding icons may be associated with one another by means of a corresponding color, by an image or in any other suitable manner. Alternatively the icons may all be the same, or the icons displayed by hyperlinks displayed in the received format 121, 122, 123, 124 may be similar to one another but different from hyperlinks displayed in the user-assist format 141, 142, 143, 144, which may again be similar to one another.

The device 100 is arranged to determine the nearest hyperlinks 121, 122, 123, 124 to the user-selected location 130 of the screen that the user touched by inspecting the HTML code associated with the displayed page. Text corresponding to an 'href' command is recognized by the device 100 to be text corresponding to a hyperlink. It is to be understood that formats other than HTML format can also be inspected. Other arrangements are also useful.

The device 100 is arranged to highlight the text of those hyperlinks 121, 122, 123, 124 as presented in the received format in one of the prescribed colors described above.

Having determined which hyperlink a user wishes to select, the device then receives data corresponding to that hyperlink such as data defining content of a new webpage to which that link relates, and displays the data.

Figure 3:
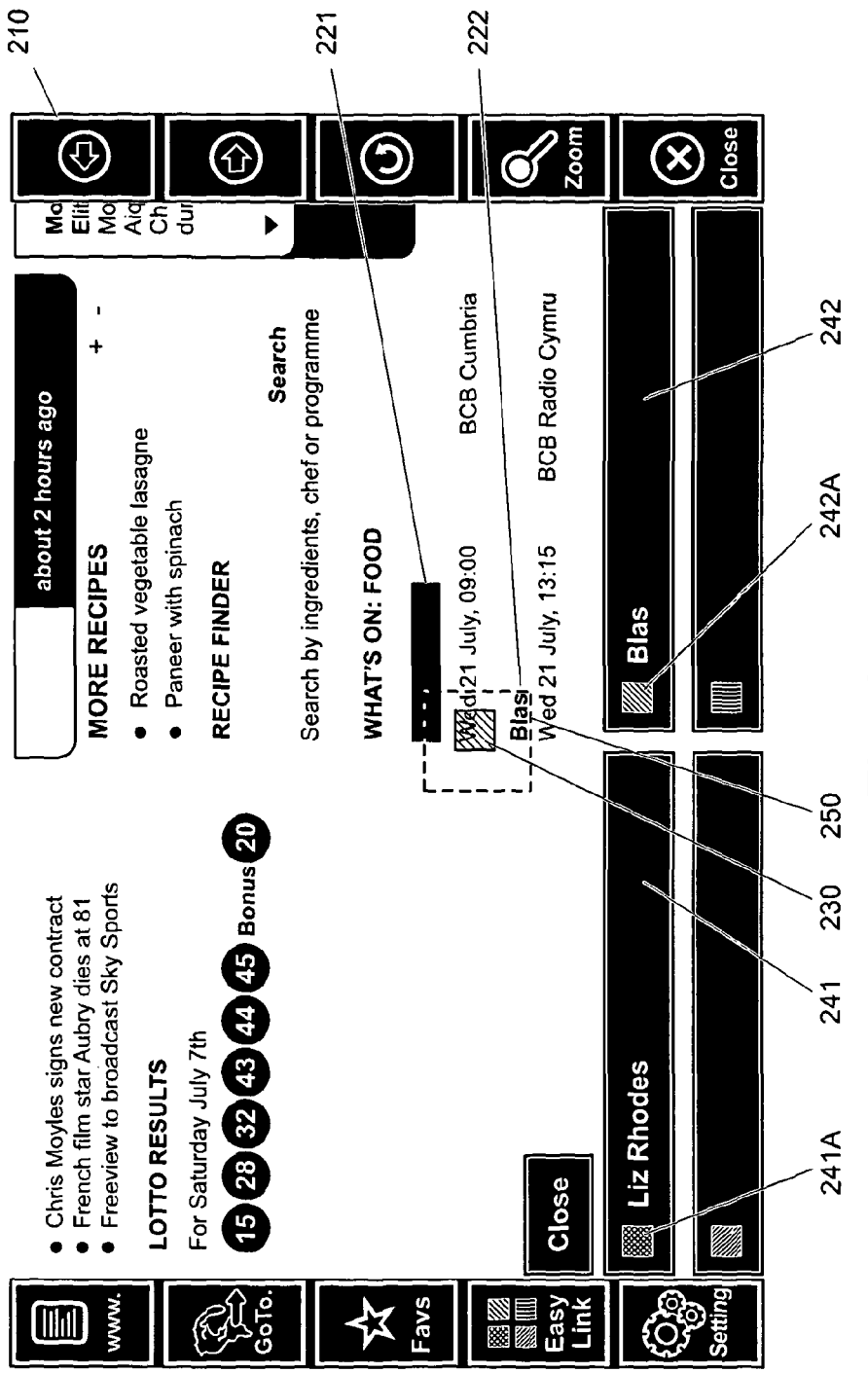
FIG. 3 shows a screenshot taken from the display portion of the same apparatus as FIG. 2 showing hyperlinks in the received format and two hyperlinks in the user-assist format.

FIG. 3 is a screenshot of a display 210 in which a device according to an embodiment of the invention has determined that the user wishes to select one of two hyperlinks 221, 222 displayed in the received format.

The suggested hyperlinks 221, 222 were selected because the device is arranged to detect hyperlinks falling within a prescribed area centered on the user-selected location 230 of the display portion 210. In the embodiment shown the prescribed area is of a square shape 250 having a side corresponding to a prescribed number of pixels. The number of pixels prescribed depends on the resolution of the display and is chosen so that the prescribed area 250 contains up to 4 hyperlinks as displayed in the font size of content typically displayed on the display portion. Other arrangements are also useful.

The text associated with the hyperlinks 221, 222 ('Liz Rhodes' and 'Blas') that falls within this area 250 has been highlighted in different respective colors for each hyperlink 221, 222. Furthermore, the text has been displayed in a user-assist format 241, 242 in a prescribed location of the display portion 210, in the example shown this is the bottom of the display portion 210. A square icon 241A, 242A having a fill color corresponding to the color of the highlight of the corresponding hyperlink 221, 222 displayed in received format is displayed next to the corresponding hyperlink as displayed in the user-assist format 241, 242.

Figure 4:
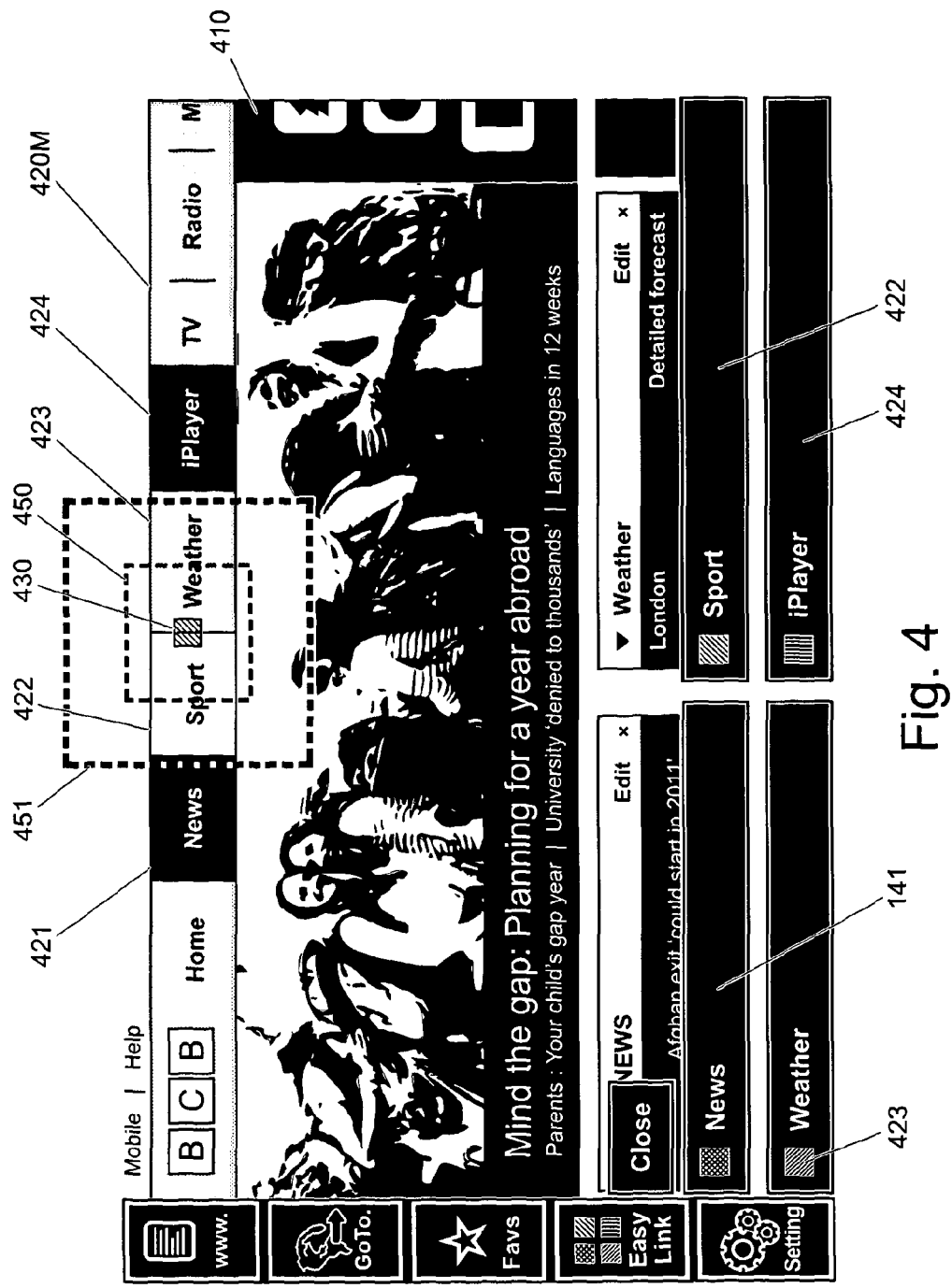
FIG. 4 shows a screenshot taken from the display portion of the same apparatus as FIG. 2 in which a horizontal menu-bar is shown in the received format, the display also showing four of the menu-bar hyperlinks in the user-assist format.

FIG. 4 is a screenshot of a display portion 410 of a device according to an embodiment of the invention in which hyperlinks 421, 422, 423, 424 associated with a menu bar 420M are displayed in received format. The hyperlinks 421, 422, 423, 424 have been suggested by the device to be hyperlinks one of which is of interest to the user based on a location of the user-selected portion 430 of the display portion 410.

In the example shown the device has determined that only two hyperlinks 422, 423 fall within the prescribed area 450 surrounding the user-selected portion 430. The device has therefore increased the size of the prescribed area to a second prescribed area 451 and determined that four hyperlinks now fall within the second prescribed area 451.

It is to be understood that in some embodiments the device may be arranged to increase the size of the prescribed area in steps until a prescribed number of hyperlinks (e.g. 4) fall within the prescribed area.

Figure 5B:
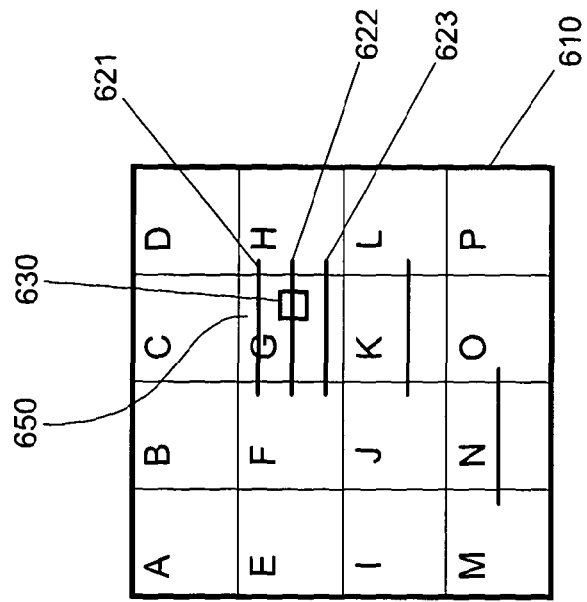
FIG. 5 shows (a) a selection box of prescribed dimensions centered on a user-selected location of the display portion and (b) a grid of possible selection boxes one of which is selected based on the user-selected location.
Figure 5A:
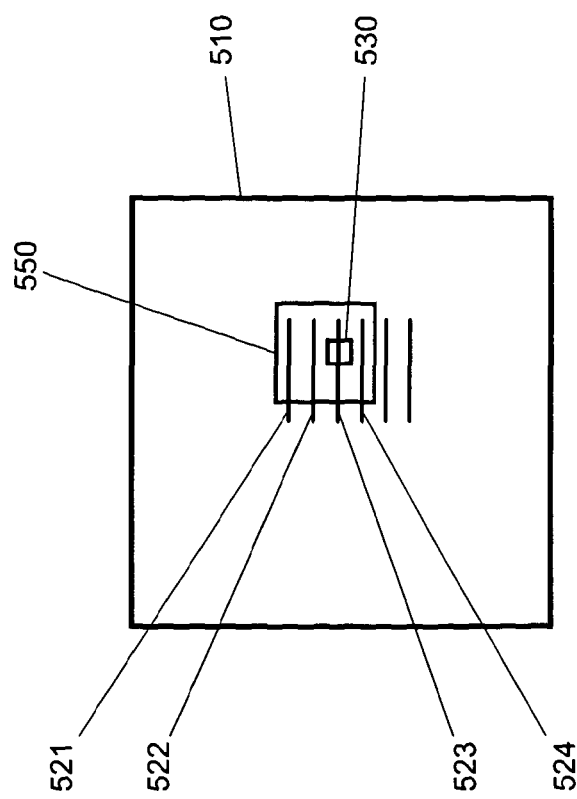

Alternatively or in addition the device may be arranged such that if the number of hyperlinks within a prescribed area is below the prescribed number to be suggested, the next nearest hyperlink(s) are selected in order to obtain the prescribed number of hyperlinks. This may be understood by reference to FIG. 5(*a*) in which a device according to an embodiment of the invention is arranged to suggest hyperlinks 521, 522, 523, 524 falling within an area 550 centered on a user-selected portion 530 of a display 510. The area 550 is of predetermined dimensions based on the expected size and spacing of text to be displayed on the display portion 510.

Other arrangements are also useful. For example, FIG. 5(*b*) illustrates a display portion 610 of a device according to an embodiment of the invention in which the display portion 610 is subdivided into fixed regions A-P. The device is arranged to identify the region A-P selected by the user (in the present example, region G), which becomes the prescribed area 650 within which the device seeks to identify function elements. In the present example the function elements are hyperlinks. In the example shown three hyperlinks have at least a portion thereof within the prescribed area 650. Therefore the device subsequently displays these hyperlinks 621, 622, 623 in the user-assist format as described above.

In addition to or instead of identifying user-selectable function elements by means of the presence of a particular command (or identifier) in code representing data to be displayed, in some embodiments the device is arranged to determine the position of user-selectable function elements on the display 110 by reference to a video memory of the device.

Thus, the device may be arranged to scan video memory of the device to detect function elements, for example by detecting text that is underlined or presented in a color corresponding to a user-selectable function element. The device may be arranged to detect function elements in the form of control buttons in graphical format, or any other form of user-selectable function element, for example from the shape or color of the element. Other means for detection are also useful.

In some embodiments the device 100 is operable to determine whether data displayed by the device 100 that is not defined in source code (such as website data received by the device 100 via an internet connection) as corresponding to a hyperlink may correspond to a function that the device 100 may perform. For example, text contained in the data displayed by the device 100 may correspond to a street address, a telephone number, an email address, a website URL or any other data in respect of which a user may desire the device to perform a function.

For example, the user may wish to navigate to a street address displayed on the screen 110 but for which there is no identifier encoded in source code indicating that a function may be associated with a particular portion of the data. For example, data corresponding to an address may not have an identifier associated with it (such as a hyperlink identifier) indicating the data is an address and that a function may be performed by the device 100 in respect of that address.

The device 100 is configured to detect the presence of a portion of data corresponding to a function which the device 100 may perform in respect of the portion of data. For example a street address (and in particular a postcode or zip code associated with the street address), an email address, a phone number and so forth.

In the case of a street address, in the event a user selects the portion of the touchscreen 110 in which the street address is displayed the device 100 may be arranged to display text in the user-assist format corresponding to a 'navigate to' function in which the vehicle is configured to provide navigation instructions to a driver to allow the driver to drive to the selected location.

In the case of some data displayed by the device (including a street address), it may be possible to perform a plurality of functions responsive to the data.

For example the device 100 may provide an option to add the data to a database associated with the device 100 such as an address book or other database, as well as performing a further function in respect of the data. Thus in the case of the street address the device may provide the option to add the address to a database or to navigate to the address.

In the case of detection of an email address, the device may provide an option to add the email address to the address book or generate a new email message to the detected email address. In the case of a telephone number the device may provide an option to add the number to the address book or to call the number. In the case of a website URL, the URL could be added to a database or the URL accessed.

In some embodiments the device 100 may search a database to see if there is corresponding data stored therein already. If there is the device 100 may display at least a portion of the further corresponding data. For example in the case of a phone number the device may display the name of the person or company to whom the number corresponds.

The device may provide an option in the user-assist format to perform a function responsive to data stored in the database that corresponds to the data displayed on the touchscreen 110. For example if the device 100 determines that a phone number displayed on the screen 110 has a street address associated with it in the database, the device 100 may give the user the option to navigate to the street address. For example if the user selects the street address displayed as an option in user-assist format the device 100 may subsequently provide an option to the user in which the device 100 provides navigational instructions to the user as to how to navigate to the street address as a destination.

In one arrangement, when a user identifies a user-selected portion of a display the device provides a list of hyperlinks that are encoded in the data to be displayed by the device, the hyperlinks being displayed in user-assist format as described above.

In some embodiments, if the device detects data not having a hyperlink encoded in the received data and for which the device determines that one or more functions may be performed by the device in respect of that data, the device provides the user with an option (in user-assist format) to perform a function associated with that data. In the case that a single function is associated with the data, selection of the option may cause the device to perform that function. In the case of a plurality of functions, selection of the option may cause the device to provide a further list of options corresponding to each of the plurality of functions associated with the data.

In some embodiments, the device may be arranged to determine whether a user wishes to select a hyperlink that was encoded in data received by the device or data for which a hyperlink has not been encoded at the time the user selects a portion of the screen.

The device may distinguish between these options responsive to the input provided by the user. For example a single tap of a touchscreen or a single click of a mouse may trigger display of hyperlinks in user-assist format in the manner hereinbefore described.

On the other hand, a double tap of the screen or a double click of the mouse may trigger display of options in respect of data in the region of the user-selected portion of the display not having a hyperlink associated therewith but for which the device has determined that a function is associated with that data.

A determination whether a portion of data is within the user-selected portion of the display may be made in a similar manner to that described above in respect of hyperlinks.

In some embodiments the device is arranged to display in user-assist format both hyperlinks encoded in data to be displayed by the device 100 and an option to execute one of one or more functions that the device has determined are associated with data displayed on the display and for which a hyperlink was not provided in the data.

It is to be understood that description of embodiments of the invention in respect of a touchscreen display are not to be understood to be limited to a touchscreen display. As noted above other input means are also useful.

It is to be understood that embodiments of the invention find application in the operation of software applications other than navigation by means of hyperlinks. For example, a user-assist functionality may be introduced into menu-driven software applications whereby menu or other function elements associated with a user-selected portion of a display may be presented in user-assist format by analogy with the above discussion with respect to hyperlinks.

Embodiments of the invention have the advantage that a risk of mis-selection of a hyperlink or other user-selected function element of a software application may be reduced or eliminated. This is because, prior to selecting a hyperlink or other function element, a user may cause the device to display hyperlinks or function elements in the vicinity of the hyperlink or function element of interest in a format allowing the user more accurately to select the hyperlink or function element of interest. The user is able to perform this task in a three-click process although it is to be understood that in some embodiments a two-click process may be employed.

In the three-click process the user (1) selects the user-assist mode, (2) selects the region of the screen in which the hyperlink or function element of interest is displayed and (3) selects from the suggested one or more hyperlinks or function elements displayed subsequently in the user-assist format the hyperlink or function element of interest.

It is to be understood that in some embodiments the first step may be eliminated by permanently setting the user-assist mode or by providing a toggle function in which the user-assist mode remains selected until the user deselects the user-assist mode.

It is to be understood that embodiments of the invention are useful in situations in which a user is unable accurately to select a region of the display portion 110 in order to follow a required hyperlink or select a required function element.

For example, a pilot of an aircraft, such as an aircraft having a glass cockpit, may be unable accurately to select a required hyperlink or control function from a control console of the aircraft in the event the aircraft encounters turbulent conditions. A control console having a user-assist feature according to an embodiment of the present invention would enable the pilot more accurately to select the required hyperlink or control button. Thus a risk that a pilot mis-selects a hyperlink or control function such as a flap position control function, a landing gear position control function, a navigation control function or any other hyperlink or control function is reduced. This has the advantage that a risk of an accident or other negative consequence of such a mis-selection is reduced.

Similarly, in the case of an in-vehicle control system a risk that a driver or passenger mis-selects a hyperlink or control function may also be reduced.

As described above, apparatus according to embodiments of the invention may be provided in the form of a substantially self-contained device. In some alternative embodiments the apparatus is provided in the form of a device that a user interacts with directly, the device being arranged to communicate with an external device such as a device arranged to provide navigation data such as geographical location data identifying a geographical location of a vehicle in which the device is provided. In some embodiments the device is arranged to communicate with a remote computing device such as a server. The server may be provided in wired or wireless communication with the device. The server may be arranged to undertake computation that would otherwise have to be performed by the device, such as parsing or other processing of data code including data to be displayed and optionally identifiers or other data to indicate how code should be displayed. The remote computing device may be arranged to determine whether the apparatus can perform a function associated with portions of the data even if the data has no identifiers indicating that a function is associated with that portion such as an identifier indicating the portion of code corresponds to a hyperlink.

The remote computing device may provide data to the device that includes an indication as to which data portions have one or more user-selectable functions associated with them, whether encoded in the original data received by or accessible to the remote computing device or identified by the remote to device itself to contain data portions having user-selectable functions associated with them. Other arrangements are also useful.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. Computing apparatus comprising a computing device, the device comprising:
   a display portion for displaying data; and
   a user input portion for receiving input from a user;
   the device being operable to display a first set of user-selectable function elements in a first format;
   the device being operable to receive via the input portion an input from a user corresponding to a user-selected portion of the display portion, to determine the number of function elements contained within the user-selected portion of the display portion, and when the determined number of function elements is less than a predetermined fixed number, to increase the size of the user-selected portion to include a maximum of the predetermined fixed number of function elements;
   the device being operable to display a second set of function elements in a second format different from the first format, the second set of function elements comprising one or more function elements of the first set of user-selectable function elements that are associated with the selected portion of the display portion; and
   the device being operable to receive a user selection of a function element displayed in the second format, whereby the user selection of the selected element may be used to execute a function associated with the selected element.

2. Computing apparatus according to claim 1, wherein the device is operable to identify a function element associated with the user-selected portion of the display as a function element having a portion thereof falling within a prescribed area of the display that contains the user-selected portion of the display, wherein the prescribed area is a portion of the display and has dimensions that are: (i) substantially fixed independent of the number of function elements displayed on the display, (ii) centered on the user-selected portion of the display, or (iii) dependent on one or more of the following factors: the number of function elements on the display, (b) the distance between two or more of the function elements on the display, or (c) the size of the function elements as displayed on the display.

3. Computing apparatus according to claim 1, wherein the device is operable to determine that a function element is a function element associated with the user-selected portion of the display if the function element is one of the N closest function elements to the user-selected portion of the display.

4. Computing apparatus according to claim 1, wherein the user-selected portion comprises one or more of a plurality of index areas of the display portion, the index areas being areas of substantially fixed size and location with respect to a boundary of the display portion.

5. Computing apparatus according to claim 1, wherein the device is operable to indicate the correspondence between function elements displayed in the first and second formats by (1) highlighting function elements displayed in the first format that are members of the second set, (2) associating a color with function elements in the first format that are members of the second set, or (3) associating an icon with function elements in the first format that are members of the second set.

6. Computing apparatus according to claim 1, wherein the device is operable to allow the user to define the user-selected portion of the display portion by selection of a plurality of positions of the display portion.

7. Computing apparatus according to claim 1, wherein the device is operable to identify user-selectable function elements based on one or more identifiers, one or more structures, or any combination of identifiers and structures, that are contained in data processed by the apparatus.

8. Computing apparatus according to claim 1, wherein the device is operable to identify user-selectable function elements by reference to a markup language defining content to be displayed.

9. Computing apparatus according to claim 8, wherein the markup language comprises HyperText Markup Language (HTML).

10. Computing apparatus according to claim 1, wherein the first set of user-selectable function elements as displayed in the first format each have text, an image or an icon associated therewith, the device being arranged to display at least a portion of the text, image or icon associated with each function element of the second set in the second format.

11. Computing apparatus according to claim 10, wherein the portion of text, image or icon displayed in the second format is larger in size on the display than the corresponding text, image or icon displayed in the first format.

12. Computing apparatus according to claim 1, wherein the computing device is a first computing device, and further comprising a second computing device remote from the display portion, the second computing device being operable to process data to be displayed on the display portion thereby to reduce an amount of processing required to be performed by the first computing device in respect of a given set of data to be displayed.

13. Computing apparatus according to claim 1, wherein the device is operable to display the first set of function element in one region of the display portion and, at the same time, to display the second set of function elements in a second region of the display portion.

14. Computing apparatus according to claim 1, wherein the device is a mobile device, a mobile communications device, or a two-way mobile telecommunications device.

15. A vehicle, vessel, or aircraft that includes the computing apparatus according to claim 1.

16. A vehicle according to claim 15, wherein the device is mounted to a dashboard of the vehicle or a seat of the vehicle.

17. A method of operating a computing device to receive a user selection of a function element displayed by the computing device, comprising the steps of:
  displaying a first set of user-selectable function elements in a first format on a display portion of a computing device;
  receiving an input from a user indicative of a user-selected portion of the display portion of the computing device;
  determining the number of function elements contained within the user-selected portion of the display portion, and when the determined number of function elements is less than a predetermined fixed number, increasing the size of the user-selected portion to include a maximum of the predetermined fixed number of function elements;
  displaying, on the display portion of the computing device and in a second format that is different from the first format, one or more of the user-selectable function elements from the first set that are associated with the user-selected portion; and
  receiving another input from the user corresponding to a function element displayed in the second format.

18. A vehicle, vessel, or aircraft that includes a computing apparatus that carries out the method of claim 17.

19. A mobile device having a display portion and an input portion, wherein the mobile device is operable to carry out the method of claim 17.

20. A non-transitory computer readable medium having stored thereon computer program code that, upon execution by a computing device, carries out the method of claim 17.

21. The method according to claim 17, wherein receiving an input from a user indicative of a user-selected portion of the display portion of the computing device comprises receiving an input corresponding to a swipe or drag action by the user, and wherein the swipe or drag action defines the user-selected portion of the display portion.

22. Computing apparatus according to claim 6, wherein the device is operable to allow the user to define the user-selected portion of the display portion by one of a swipe action or a drag action.

\* \* \* \* \*